US008014447B2

(12) United States Patent
Hinz et al.

(10) Patent No.: US 8,014,447 B2
(45) Date of Patent: Sep. 6, 2011

(54) PROCESS AND ARRANGEMENT FOR ENCODING VIDEO PICTURES

(75) Inventors: Tobias Hinz, Berlin (DE); Heiko Schwarz, Berlin (DE); Thomas Wiegand, Berlin (DE)

(73) Assignee: Thomson Licensing, Boulogne-Billancourt (FR)

( * ) Notice: Subject to any disclaimer, the term of this patent is extended or adjusted under 35 U.S.C. 154(b) by 917 days.

(21) Appl. No.: 10/570,092

(22) PCT Filed: Aug. 23, 2004

(86) PCT No.: PCT/EP2004/009391
§ 371 (c)(1),
(2), (4) Date: Aug. 11, 2008

(87) PCT Pub. No.: WO2005/022924
PCT Pub. Date: Mar. 10, 2005

(65) Prior Publication Data
US 2008/0298464 A1    Dec. 4, 2008

(30) Foreign Application Priority Data

Sep. 3, 2003   (EP) ..................................... 03090282

(51) Int. Cl.
*H04N 7/12*        (2006.01)
*H04N 11/04*       (2006.01)
(52) U.S. Cl. ............................... 375/240.03; 375/240.24
(58) Field of Classification Search ............. 375/240.03, 375/240.24
See application file for complete search history.

(56) References Cited

U.S. PATENT DOCUMENTS

| 5,579,121 | A | 11/1996 | Ohta et al. |
| 6,192,154 | B1 | 2/2001 | Rajagopalan et al. |
| 2002/0118748 | A1* | 8/2002 | Inomata et al. .......... 375/240.04 |

FOREIGN PATENT DOCUMENTS

EP    0892560    1/1999
(Continued)

OTHER PUBLICATIONS

H. Schwarz et al.: "Lagrangian Coder Control and Comparison of MPEG-4 and H-26L Video Codecs", ITG Fachberichte, VDE Verlag, Berlin, DE, No. 170, Jan. 28, 2002, pp. 301-308.

(Continued)

*Primary Examiner* — Jayanti K Patel
*Assistant Examiner* — Richard Torrente
(74) *Attorney, Agent, or Firm* — Robert D. Shedd; Paul P. Kiel; Guy H. Eriksen

(57) ABSTRACT

Today's video codecs require the intelligent choice between many coding options. This choice can efficiently be done using Lagrangian coder control. But Lagrangian coder control only provides results given a particular Lagrange parameter, which correspond to some unknown transmission rate. On the other hand, rate control algorithms provide coding results at a given bitrate but without the optimization performance of Lagrangian coder control. The combination of rate control and Lagrangian optimization for hybrid video coding is investigated. A new approach is suggested to incorporate these two known methods into the video coder control using macroblock mode decision and quantizer adaptation. The rate-distortion performance of the proposed approach is validated and analyzed via experimental results. It is shown that for most bit-rates the combined rate control and Lagrangian optimization producing a constant number of bits per picture achieves similar rate distortion performance as the constant slope case only using Lagrangian optimization.

12 Claims, 2 Drawing Sheets

FOREIGN PATENT DOCUMENTS

EP 1189451 3/2002

OTHER PUBLICATIONS

P. Subramanian et al: "Encoder Optimization in an Extended H.263 Framework", Conference Record of the 31st Asilomar Conference on Signals, Systems & Computers, Pacific Grove, CA, Nov. 2-5, 1997, vol. 1, 1998. IEEE, pp. 209-213.

J. Ribas-Corbera et al.: "Rate Control in DCT Video Coding for Low-Delay Communications", IEEE Transactions on Circuits and Systems for Video Technology, IEEE Inc. New York, US, vol. 9, No. 1, Feb. 1999, pp. 172-185.

H. Schwarz and T. Wiegand: "An Improved H.26L Coder Using Lagrangian Coder Control", ITU Study Group 16-Video Coding Experts Group, Oct. 18, 2001, pp. 1-8.

G.J. Sullivan et al: "Rate-Distortion Optimization for Video Compression", IEEE Signal Processing Magazine, IEEE Inc., New York, US, vol. 15, No. 6, Nov. 1998, pp. 74-90.

Jianfei Cai et al: "Optimal Bit Allocation for Low Bit Rate Video Streaming Applications", Proceedings 2002 International Conference on Image Processing, ICIP 2002, Rochester, NY, Sep. 22-25, 2002, Int'l Conference on Image Processing, vol. 2 of 3, Sep. 22, 2002, pp. 73-76.

Search Report Dated Oct. 12, 2004.

\* cited by examiner

| Foreman, QCIF, 10Hz | | | Tempete, CIF, 30Hz | | |
|---|---|---|---|---|---|
| target bit-rate [kbit/sec] | obtained bit-rate [kbit/sec] | mismatch | target bit-rate [kbit/sec] | obtained bit-rate [kbit/sec] | mismatch |
| 16 | 15,999 | -0,00625 % | 128 | 128 | 0,00000 % |
| 24 | 24,001 | 0,00417 % | 256 | 256,002 | 0,00078 % |
| 32 | 31,999 | -0,00313 % | 384 | 384,004 | 0,00104 % |
| 48 | 47,998 | -0,00417 % | 512 | 512,006 | 0,00117 % |
| 64 | 63,986 | -0,02188 % | 768 | 768,002 | 0,00026 % |
| 96 | 95,906 | -0,09792 % | 1024 | 1024,008 | 0,00078 % |
| 128 | 127,97 | -0,02344 % | 1280 | 1280,014 | 0,00109 % |
| 160 | 159,906 | -0,05875 % | 1536 | 1536,011 | 0,00072 % |
| 192 | 191,902 | -0,05104 % | 1792 | 1791,995 | -0,00028 % |
| 224 | 223,747 | -0,11295 % | 2048 | 2047,971 | -0,00142 % |

PROCESS AND ARRANGEMENT FOR ENCODING VIDEO PICTURES

This application claims the benefit, under 35 U.S.C. §365 of International Application PCT/EP2004/009391, filed Aug. 23, 2004, which was published in accordance with PCT Article 21(2) on Mar. 10, 2005 in English and which claims the benefit of European patent application No. 03090282.9, filed Sep. 3, 2003.

BACKGROUND OF THE INVENTION (a) Field of the Invention

The invention relates to a process and an arrangement for encoding video pictures. Particularly it concerns the operational control of the macroblock layer, and it is useable for encoding video sequences.

(b) Description of Related Art

The specification of most block-based hybrid video coding standards including MPEG-2 Visual [1], H.263 [2], MPEG-4 Visual [3] and H.264/AVC [4] provide only the bit-stream syntax and the decoding process in order to allow interoperability. References listed as numbers within the specification between square brackets are identified at the end of the detailed description of the application under the heading "References". The encoding process is left out of scope to permit flexible implementations. However, the operational control of the source encoder is a key problem in video compression. For the encoding of a video source, a variety of coding parameters such as quantization parameters, macroblock and block modes, motion vectors, and quantized transform coefficients has to be determined. On one hand, the chosen values determine the rate-distortion efficiency of the produced bit-stream for a given decoder. On the other hand, these parameters also determine the required transmission rate and decoding delay.

BRIEF SUMMARY OF THE INVENTION

In real-time video communications over a fixed-rate channel, the general goal of the operational coder control is to obtain the best possible video quality while keeping the given conditions on transmission rate and decoding delay. Due to the large parameter space involved, this is a non-trivial problem. Furthermore, the operational coder control is required to be as low-complex that it can be applied in real-time applications.

A widely accepted approach for rate-distortion optimized encoding is the Lagrangian bit-allocation technique. The popularity of this approach is due to its effectiveness and simplicity. Given a fixed quantization parameter QP for a macroblock, the macroblock mode as well as associated block modes and motion vectors are determined by minimizing a Lagrangian cost functional $$D+\lambda(QP)\cdot R,$$

in which a distortion measure D is weighted against a rate term R using a Lagrangian multiplier $\lambda$. The Lagrangian multiplier $\lambda$ depends only on the given macroblock quantization parameter QP. This Lagrangian coder control was successfully applied to H.263, MPEG-4 Visual and H.264/AVC by the authors [5,6,7,8]. In all cases, this improved encoding strategy provides visible performance gains compared to previous encoding strategies of H.263, MPEG-4 Visual and H.264/AVC, respectively, when the video source was coded using a fixed quantization parameter QP.

A simple and efficient macroblock rate-control algorithm for operating block-based hybrid video coders was presented in [9]. Given the target number of bits for a picture and the prediction error signals of all macroblocks inside this picture, the macroblock quantization parameters QP are adjusted in a way that the target number of bits is hit quite accurately while the distortion of the picture is minimized.

The combination of these two coder control strategies, the Lagrangian bit-allocation technique and the macroblock-based rate control algorithm, is not straightforward since the following interdependencies have to be taken into consideration:

For the rate control, the determination of the macroblock quantization parameters QP depends on the residual signal and thus on the estimated motion vectors as well as the chosen macroblock and block coding modes.

For the Lagrangian optimization, the motion estimation and macroblock/block mode decision are based on a minimization of a Lagrangian cost function in which a distortion measure is weighted against a rate term using a Lagrange multiplier $\lambda$. Since the Lagrange multiplier $\lambda(QP)$ is a function of the quantization parameter QP, the residual signal also depends on the quantization parameter.

Furthermore, the performance of the operational coder control must always be seen in conjunction with complexity considerations including the avoidance of multiple encodings as the above two items suggest due to the interdependency of the parameters QP and $\lambda$.

Thus, the technical problem to be solved by the invention is to provide a process and an arrangement for encoding video pictures, as well as an appropriate computer program and an appropriate storage medium, which provide the rate-distortion-efficiency of the Lagrangian bit-allocation technique as well as the rate-control property.

This task assignment is solved according to the invention by means of the features of the Claims 1, 10, 11 and 12.

The present invention solves this problem in such a way that a pre-analysis of pictures is carried out, wherein for at least a part of the macroblocks at least one of the control-parameters which assist the encoding process is determined based on at least one estimated parameter, in a second step the picture is encoded with encoding-parameters calculated based on the control-parameters determined in the pre-analysis step.

An arrangement for encoding video pictures comprises at least one chip and/or processor, wherein chip and/or processor is (are) installed in such a manner, that a process for encoding video pictures can be executed in a manner so that a pre-analysis of pictures is carried out, wherein for at least a part of the macroblocks at least one of the control-parameters which assist the encoding process is determined based on at least one estimated parameter, in a second step the picture is encoded with encoding-parameters calculated based on the control-parameters determined in the pre-analysis step.

In some cases the process for encoding video pictures is advantageously carried out by a computer program. Such a computer program enables a computer to run a process for encoding video pictures after it has been stored into the computers memory, wherein the computer program contains programming code for executing a process of encoding video pictures, where a pre-analysis of pictures is carried out, wherein for at least a part of the macroblocks at least one of the control-parameters which assist the encoding process is determined based on at least one estimated parameter, in a second step the picture is encoded with encoding-parameters calculated based on the control-parameters determined in the pre-analysis step.

For instance such a computer program can be made available (free of charge or for a fee) as downloadable data file in a communication network or a network for data transfer. Computer programs made available in this manner can be acquired by a process in that a computer program as described in claim 11 is downloaded from a network for data transfer, for example the internet, to a data processing unit, that is connected to said network.

For carrying out an encoding for video pictures advantageously a computer-readable storage medium is used, on which a program is stored, that enables the computer to execute a process for encoding video pictures, after it has been stored in the memory of the computer, wherein the computer program contains programming code for executing a process for encoding video pictures, where a pre-analysis of pictures is carried out, wherein for at least a part of the macroblocks at least one of the control-parameters which assist the encoding process is determined based on at least one estimated parameter, in a second step the picture is encoded with encoding-parameters calculated based on the control-parameters determined in the pre-analysis step.

In a preferred embodiment of the invention an energy measure of the residual signal of a macroblock representing the difference between the original macroblocks samples and their prediction is used as control parameter, which is determined based on at least one estimated parameter in the pre-analysis step In an other preferred embodiment of the invention the energy measure of the residual signal that is used as control parameter is calculated as the average of the variances of the residual signals of the luminance and chrominance blocks inside a macroblocks that are used for transform coding according to:

$$\sigma_i^2 = \frac{1}{N_B \cdot N_P} \sum_{j=1}^{N_B} \sum_{k=1}^{N_P} (d_{i,j}(k) - \overline{d_{i,j}})^2$$

where $N_B$ and $N_P$ are the number of blocks (luminance and chrominance) used for transform coding inside a macroblock and the number of samples inside such a block, respectively, $d_{i,j}$ is the residual signal of the block j inside the macroblock i, and $\overline{d_{i,j}}$ represents the average of the $d_{i,j}$.

In a further preferred embodiment of the invention the prediction signal of macroblocks in intra coded pictures is assumed to consist of samples with the value of zero, and thus the residual signal corresponds to the original macroblock samples, for predictive coded pictures, the prediction signal of macroblocks used for determining the control parameters is estimated by motion compensated prediction using one or more displacement vectors and reference indices that are estimated in the pre-analysis step.

In a further preferred embodiment of the invention the pre-analysis step includes the estimation of displacement vectors m and reference indices r by minimizing the Lagrangian cost function $$[\hat{m}, \hat{r}] = \underset{m,r}{\operatorname{argmin}} \{D_{DFD}(m, r) + \lambda_{motion} \cdot R_{MV}(m, r)\},$$

where $$D_{DFD}(m, r) = \sum_{(x,y) \in B} |s(x, y, t) - s'(x - m_x, y - m_y, t_r)|$$

determines the distortion term, $s(\ldots, t)$ and $s'(\ldots, t_r)$ represent the array of luminance samples of the original picture and the decoded reference picture given by the reference index r, respectively, $R_{MV}(m,r)$ specifies the number of bits needed to transmit all components of the displacement vector $[m_x, m_y]^T$ and the reference index r, B is the area of the macroblock, macroblock partition, or sub-macroblock partition for which the displacement vector and the reference index are estimated, and $\lambda_{motion} \geq 0$ is the Lagrangian multiplier.

In a further preferred embodiment of the invention the Lagrangian multiplier $\lambda_{motion}$ used for displacement vector estimation in the pre-analysis step is set in accordance with $$\lambda_{motion} = \sqrt{0.85 \cdot \overline{QP}^2} \text{ for H.263,MPEG-4 or}$$

$$\lambda_{motion} = \sqrt{0.85 \cdot 2^{((\overline{QP}-12)/3)}} \text{ for H.264/AVC}$$

where $\overline{QP}$ represents the average quantization parameter of the last encoded picture of the same picture type.

In a further preferred embodiment of the invention the displacement vector estimation in the pre-analysis step is done for the entire macroblock covering an area of 16×16 luminance samples, and the reference index r is not estimated but determined in a way that it refers to the temporally closest reference picture that is stored in the decoded picture buffer.

Using the invention it is possible to perform an operational coder control for block-based hybrid video codecs that provides the rate-distortion efficiency of rate-distortion optimized encoders [5,6,7,8] as well as an accurate rate control suitable for low-delay interactive applications. The simulation results for MPEG-4 Visual and H.264/AVC show that the proposed encoding strategy achieves virtually the same rate-distortion performance as the rate-distortion optimized encoders without rate control.

The invention concerns the operational control of the macroblock layer. It is assumed that a given global rate control sets the target number of bits for a picture so that the conditions on transmission rate and decoding delay are kept. The operational control of the macroblock layer determines the quantization parameters, macroblock and block modes, motion vectors, and quantized transform coefficients in a way that this target number of bits a hit as accurately as possible while the distortion of the picture is minimized.

BRIEF DESCRIPTION OF THE DRAWINGS

The following examples are provided to describe the invention in further detail. These examples are intended to illustrate and not to limit the invention.

DETAILED DESCRIPTION OF THE INVENTION

Figure 1:
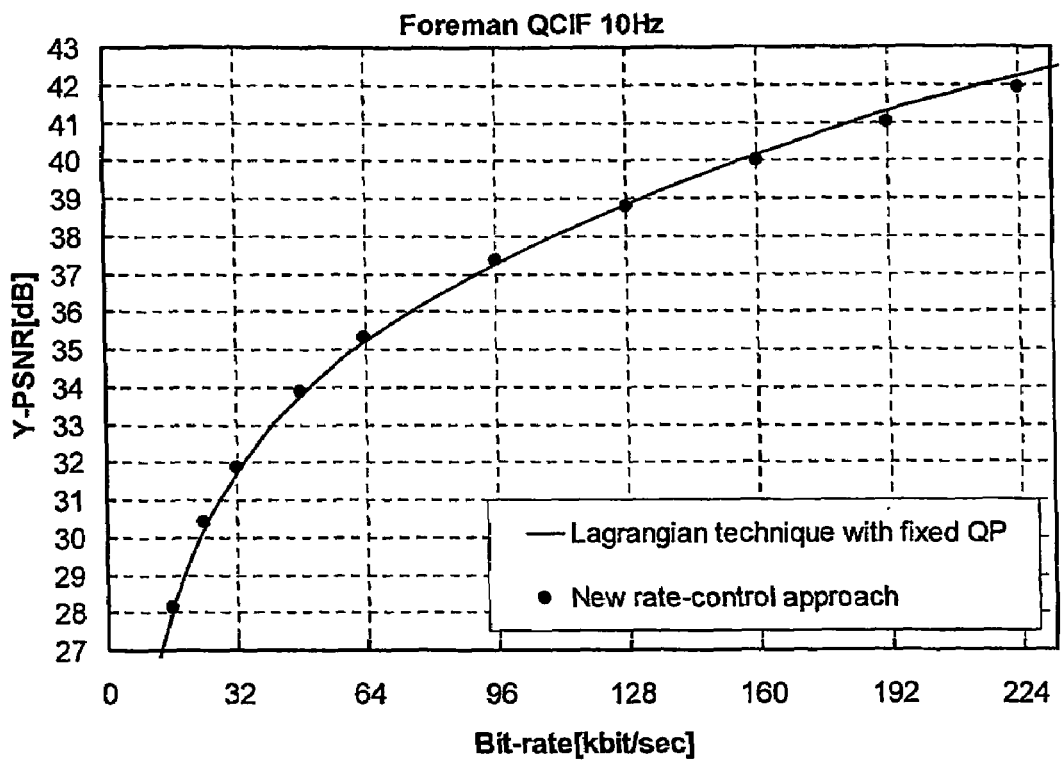
FIG. 1 Rate-distortion performance of our proposed encoding strategy (points) in comparison to the rate-distortion optimized encoding strategy [8] without rate control (solid line) for the Foreman sequence (QCIF, 10 pictures per second), FIG. 2 Rate-distortion performance of our proposed encoding strategy (points) in comparison to the rate-distortion optimized encoding strategy [8] without rate control (solid line) for the Tempete sequence (CIF, 30 pictures per second), FIG. 3 Obtained average bit-rates in comparison to the target bit-rate for the proposed encoding strategy.

In the following sections this invention is described by an operational coder control using the inventional encoding process for video pictures. The described operational coder control combines the advantages of both approaches, the rate-distortion efficiency of Lagrangian bit-allocation technique as well as the rate-control property of [9].

In [5], it has been observed that the Lagrangian motion estimation has a very minor impact on the rate distortion performance when being used for H.263 baseline coding. This is because the bit-rate consumed by the motion vectors assigned to 16×16 blocks is very small and the impact of an unsuitable choice of $\lambda$ for the motion estimation process is very small. Therefore, in our new encoding strategy the determination of the macroblock quantization parameters QP is based on an initial estimation of the residual signal using 16×16 blocks only. For that, the Lagrangian parameter $\lambda$ is set employing the average quantization parameter $\overline{QP}$ of the last encoded picture of the same picture type. The quantization parameters QP (and thus the corresponding Lagrangian parameters $\lambda$) are selected similar to the approach of [9] using the estimated prediction error signals and the remaining bit budget. Based on these parameters, the motion vectors as well as the macroblock and block modes are chosen by minimizing the corresponding Lagrangian cost functions.

Since the subject of our invention is the suitable combination of two approaches concerning the operational control of the macroblock layer, the whole operational control algorithm is briefly described to avoid a misunderstanding of the concept. The main contribution is a simple low-cost solution of the interdependence problem between the Lagrangian bit-allocation technique and the rate control approach. This problem is solved by introducing a low-cost pre-analysis/pre-estimation step using only 16×16 blocks and a single reference picture. As a consequence, some algorithmic details of the rate control approach in [9] had to be adapted.

In the following sections 1 and 2 the whole algorithm of the operational control of the macroblock layer is described. Experimental results comparing the performance of the proposed algorithm with the constant slope approach only using Lagrangian optimization are given in section 3.

1. Initialization of Macroblock Layer Operational Control

The target number of bits for a picture $R_{total}$ is set by a global rate control algorithm. The bit budget $R_B$ for transmitting the macroblock-layer syntax elements of that picture is initialized as $$R_B = R_{total} - R_{header}, \quad (1)$$

where $R_{header}$ represents the average number of bits needed for encoding the picture and/or slice header information of the given picture type.

For predictive coded pictures, an initial motion estimation step for 16×16 blocks and the temporally closest reference picture is performed for all macroblocks i of the picture. The corresponding initial motion vectors $\hat{m}_i$ are obtained by minimizing the Lagrangian cost function $$\hat{m}_i = \underset{m \in M}{\operatorname{argmin}} \{D_{DFD}(i,m) + \lambda_{motion} \cdot R_{MV}(i,m)\} \quad (2)$$

with the distortion term being given as $$D_{DFD}(i,m) = \sum_{(x,y) \in B_i} |s(x,y,t) - s'(x - m_x, y - m_y, t - \Delta t)|. \quad (3)$$

$s(\ldots, t)$ and $s'(\ldots, t-\Delta t)$ represent the luminance signals of the original picture and the decoded reference picture, respectively. $R_{MV}(i,m)$ specifies the number of bits needed to transmit all components of the motion vector $[m_x, m_y]^T$, M is the motion vector search range, and $B_i$ represents the area of the i-th macroblock.

For this initial estimation step, the Lagrangian multiplier $\lambda_{motion}$ is set using the average quantization parameter $\overline{QP}$ of the last encoded picture of the same picture type:

H.263, MPEG-4:

$$\lambda_{motion} = \sqrt{0.85 \cdot \overline{QP}^2} \quad (4)$$

$$\text{JVT/H.264:} \lambda_{motion} = \sqrt{0.85 \cdot 2^{((\overline{QP}-12)/3)}} \quad (5)$$

Based on this initial estimation or on the original source data (for intra pictures), a variance measure $\sigma_i^2$ is calculated for each macroblock according to this invention $$\sigma_i^2 = \frac{1}{N_B \cdot N_P} \sum_{j=1}^{N_B} \sum_{k=1}^{N_P} (d_{i,j}(k) - \overline{d_{i,j}})^2. \quad (6)$$

$N_B$ and $N_P$ are the number of blocks (luminance and chrominance) used for transform coding inside a macroblock and the number of samples inside such a block, respectively. $d_{i,j}$ represents the residual signal of the block j inside the macroblock i, its average is denoted by $\overline{d_{i,j}}$. For intra pictures, this residual signal corresponds to the original macroblock samples, for predictive coded pictures, it represents the prediction error signal.

Based on the variance measures, a weighting factor $\alpha_i$ is assigned to each macroblock i according to (see [9])

$$\alpha_i = \begin{cases} 2 \cdot R_B / N \cdot (1 - \sigma_i) + \sigma_i : & R_B / N < 0.5 \\ 1 : & \text{otherwise} \end{cases}, \quad (7)$$

where N is the number of macroblocks inside the picture.

The following parameters are set to their initial values [9]:
remaining complexity measure:

$$S_1 = \sum_{i=1}^{N} \alpha_i \cdot \sigma_i$$

remaining macroblocks: $N_1 = N$
remaining bit budget: $B_1 = R_B$
model parameters: $K_1 = K_N$ (last picture of same type)
$\quad C_1 = C_N$ (last picture of same type)
$\quad j_K = 0$ For the first picture of a sequence, the model parameters $K_1$ and $C_1$ are set to some predefined values.

2. Operational Control of the Macroblock Layer 2.1. Target Quantization Parameter Setting The target quantization step size $Q_i^*$ for the i-th macroblock is set according (see [9]) to $$Q_i^* = \begin{cases} \max\left(Q_{min}, \min\left(Q_{max}, \sqrt{\frac{K_i \cdot \sigma_i \cdot S_i}{\alpha_i \cdot (B_i - N_i \cdot C_i)}}\right)\right): & B_i > N_i \cdot C_i \\ Q_{max}: & B_i \leq N_i \cdot C_i \end{cases} \quad (8)$$

where $Q_{min}$ and $Q_{max}$ are the minimum and maximum quantization step size supported by the syntax.

Based on the target quantization step size, the target quantization parameter $QP_i^*$ is set according (see [9]) to $$QP_i^* = \max(QP_{i-1} - \Delta QP_{max}, \min(QP_{i-1} + \Delta QP_{max}, f_Q(Q_i^*))), \quad (9)$$

where $QP_{i-1}$ is the quantization parameter of the last macroblock and $\Delta QP_{max}$ is the maximum allowed quantizer changing (given by the syntax or user-defined). The function $f_Q(\ldots)$ specifies the mapping of quantization step sizes onto quantization parameters; it depends on the underlying syntax.

2.2. Macroblock Motion Estimation and Mode Decision

The Lagrangian multipliers used for motion estimation and mode decision of the macroblock i are set according to [5] based on the chosen target quantization parameter as follows:

$$H.263, MPEG-4: (\lambda_{motion,i})^2 = \lambda_{mode,i} = 0.85 \cdot QP_i^{*2} \quad (10)$$

$$H.264/AVC: (\lambda_{motion,i})^2 = \lambda_{mode,i} = 0.85 \cdot 2^{((QP_i^* - 12)/3)} \quad (11)$$

For all motion-compensated macroblock/block modes the associated motion vectors $m_i$ and reference indices $r_i$ (H.263 Annex U and H.264/AVC) are obtained by minimizing the Lagrangian functional (cf. (2))

$$[m_i, r_i] = \underset{m \in M, r \in R}{\operatorname{argmin}} \{D_{DFD}(i, m, r) + \lambda_{motion,i} \cdot R_{MV}(i, m, r)\} \quad (12)$$

with the distortion term being given as $$D_{DFD}(i, m, r) = \sum_{(x,y) \in B_i} |s(x, y, t) - s'(x - m_x, y - m_y, t_r)|. \quad (13)$$

At this, R denotes the set of reference pictures stored in the decoded picture buffer, M specifies the motion vectors search range inside a reference picture, $t_r$ is the sampling time of a reference picture referred by the reference index r, $s(\ldots, t)$ and $s'(\ldots, t_r)$ represent the luminance signals of the original picture and the decoded reference picture, respectively, and $R_{MV}(i,m,r)$ specifies the number of bits needed to transmit all components of the motion vector $m = [m_x, m_y]^T$ as well as the reference index r.

The determination of the macroblock (or block) modes for given macroblock (block) follows basically the same approach. From a given set of possible macroblock/block modes $S_{mode}$, the mode $p_i$ that minimizes the following Lagrangian cost function is chosen $$p_i = \underset{p \in S_{mode}}{\operatorname{argmin}} \{D_{REC}(i, p | QP_i^*) + \lambda_{mode} \cdot R_{all}(i, p | QP_i^*)\}. \quad (14)$$

The distortion measure represents the sum of squared differences between the original macroblock/block samples s and the reconstructed samples s'

$$D_{REC}(i, p | QP_i^*) = \sum_{(x,y) \in B} (s(x, y) - s'(x, y | p, QP_i^*))^2, \quad (15)$$

where B specifies the set of corresponding macroblock/block samples. $R_{all}(i, p | QP_i^*)$ is the number of bits associated with choosing the mode p and the quantization parameter $QP_i^*$, it includes the bits for the macroblock header, the motion vectors and reference indices as well as the quantized transform coefficients of all luminance and chrominance blocks.

2.3. Final Setting of the Quantization Parameter

The quantization parameter $QP_i$ used for transmitting the macroblock syntax elements depends on the chosen macroblock mode and its associated parameters as quantized transform coefficients. If the syntax allows a quantizer changing for the chosen macroblock parameters a quantization parameter of $QP_i = QP_i^*$ is chosen, otherwise the quantization parameter from the last macroblock is taken: $QP_i = QP_{i-1}$.

2.4. Model Update for the Operational Macroblock Layer Control

After the encoding of a macroblock is finished, the model parameters of the operational coder control are updated. In a first step, the so-called macroblock parameters $K_{MB}$ and $C_{MB}$ are calculated according to this invention $$K_{MB} = Q_i^{**} \cdot (R_{all,i} - R_{MV}(\hat{m}_i))/(\sigma_i^2) \quad (16)$$

$$C_{MB} = R_{MV}(\hat{m}_i) \quad (17)$$

where $Q_i^{**}$ denotes the quantization step size that corresponds to the target quantization parameter $QP_i^*$: $Q_i^{**} = f_Q^{-1}(QP_i^*)$. $R_{all}$ is the number of bits used for encoding the considered macroblock including all syntax elements, and $R_{MV}(\hat{m}_i)$ is the number of bits associated with the motion vector $\hat{m}_i$, which has been estimated in the initialization step (sec. 1). The average model parameters of the currently encoded picture, $K_F$ and $C_F$, are set according to (see [9])

$$C_F = C_F \cdot (i-1)/i + C_{MB}/i \quad (18)$$

if ($K_{MB} > 0$ and $K_{MB} < 1000$)
{

$$j_K = j_K + 1 \quad (19)$$

$$K_F = K_F \cdot (j_K - 1)/j_K + K_{MB}/j_K \quad (20)$$

}

Based on these parameters the model parameters used for encoding the following macroblock are updated as follows (see [9]):

remaining complexity measure: $S_{i+1} = S_i - \alpha_i \cdot \sigma_i$
remaining macroblocks: $N_{i+1} = N_i - 1$
remaining bit budget: $B_{i+1} = B_i - R_{all,i}$
model parameters:

$$K_{i+1} = K_F \cdot i/N + K_1 \cdot (N-i)/N \quad (21)$$

$$C_{i+1} = C_F \cdot i/N + C_1 \cdot (N-i)/N \quad (22)$$

3. Experimental Results

The efficiency of our new encoding strategy is demonstrated for the H.264/AVC video coding standard by comparing it to the encoding strategy only using Lagrangian optimization (for a fixed value of the quantization parameter for the whole sequence). Both encoders use only one Intra picture at the beginning of the sequence, all following pictures are coded as predictive coded P-pictures. In both cases five reference pictures are used. The motion estimation is done by a logarithmic integer-pixel search over the range of [−32 ... 32]×[−32 ... 32] samples and a subsequent half- and quarter-pixel refinement. The entropy coding is done using context-adaptive binary arithmetic coding (CABAC).

For our new encoding strategy the following simple global rate control technique was used. Given the number N of pictures to be encoded, the target average bit-rate R in kbit/ sec, and the picture rate F in Hz, the target number of bits $B_1^*$ for the first Intra picture i=1 is determined by $$B_1^* = \frac{6000 \cdot N \cdot R}{F \cdot (N+5)}.$$

For all remaining P-pictures i>1, the target bit budget is set to $$B_i^* = \frac{1}{N-i+1} \cdot \left( \frac{1000 \cdot N \cdot R}{F} - \sum_{k=1}^{i-1} B_k \right)$$

where $B_k$ denotes the number of bits actually consumed by the k-th picture.

Figure 2:
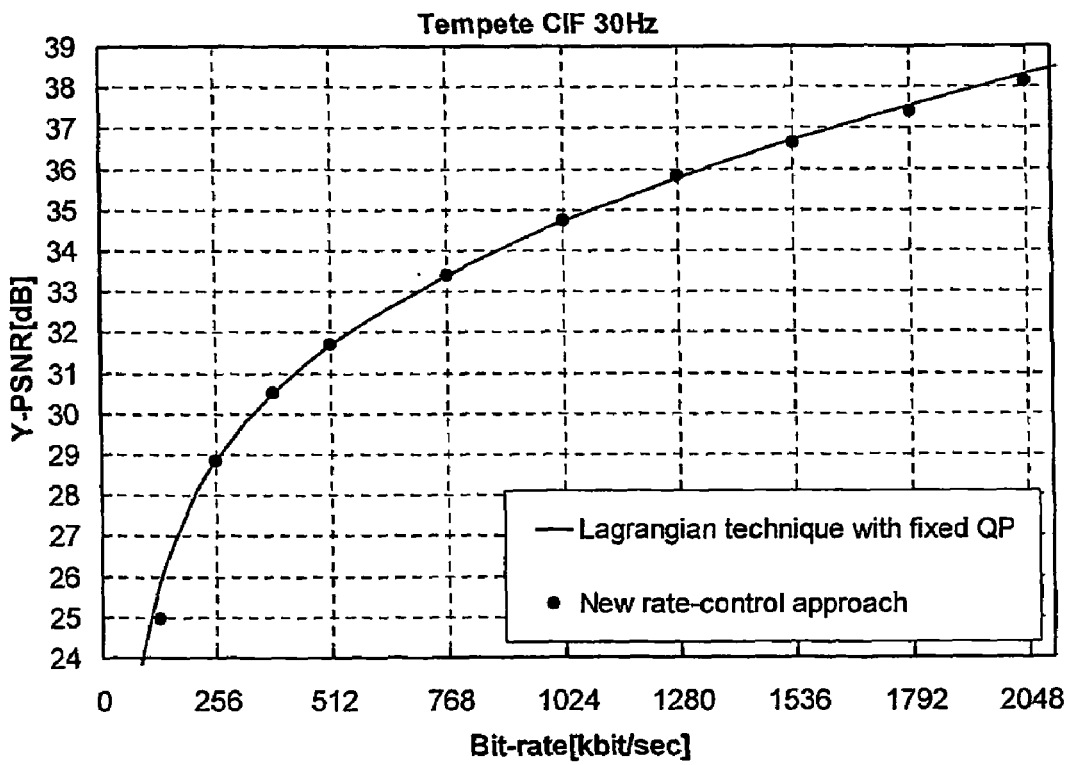

In the FIGS. 1 and 2, the rate-distortion performance of both encoders is compared for two test sequences with different characteristics. The curves show the average PSNR of the luminance component versus average bit-rate measured of the complete bit-stream. It can be seen, that our proposed encoding strategy provides virtually the same rate-distortion efficiency as the rate-distortion optimized encoder without rate control [8] while the target bit-rate is accurately hit.

The obtained average bit-rates for our proposed encoder are shown in Table 1 together with the target bit-rates.

REFERENCES

[1] ITU-T and ISO/IEC JTC1, "Generic coding of moving pictures and associated audio information—Part 2: Video," ITU-T Recommendation H.262—ISO/IEC 13818-2 (MPEG-2), November 1994.
[2] ITU-T, "Video coding for low bitrate communication," ITU-T Recommendation H.263; version 1, November 1995; version 2, January 1998.
[3] ISO/IEC JTC1, "Coding of audio-visual objects—Part 2: Visual," ISO/IEC 14496-2 (MPEG-4 visual version 1), April 1999; Amendment 1 (version 2), February 2000.
[4] T. Wiegand, G. Sullivan, A. Luthra, "Draft ITU-T Recommendation and Final Draft International Standard of Joint Video Specification (ITU-T Rec. H.264 ISO/IEC 14496-10 AVC)," Joint Video Team (JVT) of ISO/IEC MPEG and ITU-T VCEG, JVT-G050r1, May 2003.
[5] T. Wiegand, B. D. Andrews, "An Improved H.263 Coder Using Rate-Distortion Optimization," Doc. ITU-T/SG17/Q15-D-13, April 1998.
[6] G. J. Sullivan, T. Wiegand, "Rate-Distortion Optimization for Video Compression," in *IEEE Signal Processing Magazine*, vol. 15, no. 6, pp. 74-90, November 1998.
[7] H. Schwarz, T. Wiegand, "An Improved MPEG-4 Coder Using Lagrangian Coder Control," ITU-T/SG16/Q6/VCEG-M49, April 2001, Austin, Tex., USA.
[8] H. Schwarz, T. Wiegand, "An Improved H.26L Coder Using Lagrangian Coder Control," ITU-T/SG16/Q6/VCEG-D146, June 2001, Porto Seguro, Brazil.
[9] J. Ribas-Corbera, S. Lei, "Rate Control in DCT Video Coding for Low-Delay Communications," in IEEE Transactions on Circuit and Systems for Video Technology, vol. 9, no. 1, February 1999.

The invention claimed is:
1. Process for encoding video pictures in a video coder, wherein
a pre-analysis of pictures is carried out, wherein for at least a part of macroblocks at least one control-parameter which assists the encoding process is determined based on at least one estimated parameter,
in a second step the picture is encoded on macroblock level with encoding-parameters calculated based on the control-parameters determined in the pre-analysis step, wherein the macroblock encoding process comprises the following steps given a target quantization parameter $QP_i^*$:
calculating Lagrangian multipliers used for motion estimation and mode decision of a macroblock i according to:

$(\lambda_{motion,i})^2 = \lambda_{mode,i} = 0.85 \cdot QP_i^{*2}$ for H.263, MPEG-4, or $(\lambda_{motion,i})^2 = \lambda_{mode,i} = 0.85 \cdot 2^{((QP_i^* - 12)/3)}$ for H.264/AVC, for all motion-compensated macroblock/block modes determining associated motion vectors $m_i$ and a reference index $r_i$ by minimizing a Lagrangian functional $$[m_i, r_i] = \underset{m \in M, r \in R}{\mathrm{argmin}} \{D_{DFD}(i, m, r) + \lambda_{motion,i} \cdot R_{MV}(i, m, r)\},$$

with a distortion term being given as $$D_{DFD}(i, m, r) = \sum_{(x,y) \in B_i} |s(x, y, t) - s'(x - m_x, y - m_y, t_r)|,$$

where $s(\ldots, t)$ and $s'(\ldots, t_r)$ represent an array of luminance samples of an original picture and a decoded reference picture given by a reference index r, respectively,
R denotes a set of reference pictures stored in the decoded picture buffer,
M specifies a motion vectors search range inside a reference picture,
$t_r$ is a sampling time of a reference picture referred by the reference index r,
B is the area of a corresponding block or macroblock, and
$R_{MV}(i,m,r)$ specifies a number of bits needed to transmit all components of a motion vector $m = [m_x, m_y]^T$ as well as the reference index r;
determining macroblock/block encoding modes $p_i$ of a macroblock i by minimizing a Lagrangian cost function $$p_i = \underset{p \in S_{mode}}{\mathrm{argmin}} \{D_{REC}(i, p | QP_i^*) + \lambda_{mode} \cdot R_{all}(i, p | QP_i^*)\}$$

where $D_{REC}(i, p | QP_i^*)$ is defined as $$D_{REC}(i, p | QP_i^*) = \sum_{(x,y) \in B} (s(x, y) - s'(x, y | p, QP_i^*))^2$$

$s(\ldots)$ and $s'(\ldots)$ represent an array of original macroblock samples and their reconstruction, respectively,
B specifies a set of corresponding macroblock/block samples, $R_{all}(i,p|QP_i^*)$ is a number of bits associated with choosing a mode p and quantization parameter $QP_i^*$, including bits for the macroblock/block modes, motion vectors and reference indices as well as quantized transform coefficients of all luminance and chrominance blocks, and $S_{mode}$ is a given set of possible macroblock/block modes.

2. Process according to claim 1,
wherein
an energy measure of a residual signal of a macroblock representing the difference between an original macroblocks samples and their prediction is used as control parameter, which is determined based on at least one estimated parameter in the pre-analysis step.

3. Process according to claim 2,
wherein
the energy measure of the residual signal is calculated as the average of variances of the residual signals of luminance and chrominance blocks inside a macroblocks i that are used for transform coding according to:

$$\sigma_i^2 = \frac{1}{N_B \cdot N_P} \sum_{j=1}^{N_B} \sum_{k=1}^{N_P} (d_{i,j}(k) - \overline{d_{i,j}})^2$$

where
$N_B$ and $N_p$ are the number of blocks (luminance and chrominance) used for transform coding inside a macroblock and the number of samples inside such a block, respectively,
$d_{i,j}$ is the residual signal of the block j inside the macroblock i, and
$\overline{d_{i,j}}$ represents the average of the $d_{i,j}$.

4. Process according to claim 1,
wherein
for predictive coded pictures, the prediction signal of macroblocks used for determining the control parameters is estimated by motion compensated prediction using one or more displacement vectors and reference indices that are estimated in the pre-analysis step.

5. Process according to claim 1,
wherein the pre-analysis step includes an estimation of displacement vectors m and reference index r by minimizing a Lagrangian cost function $$[\hat{m}, r] = \operatorname*{argmin}_{m,r} \{D_{DFD}(m, r) + \lambda_{motion} \cdot R_{MV}(m, r)\},$$

where $$D_{DFD}(m, r) = \sum_{(x,y) \in B} |s(x, y, t) - s'(x - m_x, y - m_y, t_r)|$$

determines a distortion term,
s( . . . , t) and s'( . . . , $t_r$) represent an array of luminance samples of an original picture and a decoded reference picture given by the reference index r, respectively,
$R_{MV}(m,r)$ specifies a number of bits needed to transmit all components of a displacement vector $[m_x,m_y]^T$ and the reference index r,
B is the area of a macroblock, macroblock partition, or sub-macroblock partition for which the displacement vector and the reference index are estimated, and
$\lambda_{motion} \geq 0$ is the Lagrangian multiplier.

6. Process according to claim 5,
wherein
the Lagrangian multiplier $\lambda_{motion}$ used for displacement vector estimation in the pre-analysis step is set in accordance with $$\lambda_{motion} = \sqrt{0.85 \cdot \overline{QP^2}} \text{ for H.263,MPEG-4 or}$$

$$\lambda_{motion} = \sqrt{0.85 \cdot 2^{((\overline{QP}-12)/3)}} \text{ for H.264/AVC}$$

where $\overline{QP}$ represents an average quantization parameter of a last encoded picture of a same picture type.

7. Process according to claim 1,
wherein
a displacement vector estimation in the pre-analysis step is done for the entire macroblock covering an area of 16×16 luminance samples, and the reference index r is not estimated but determined in a way that it refers to the temporally closest reference picture that is stored in the decoded picture buffer.

8. Process according to claim 1,
wherein
during the encoding process for each macroblock i a target quantization parameter $QP_i^*$ is determined in dependence of the control parameters estimated in the pre-analysis step.

9. Arrangement with at least one chip and/or processor that is (are) installed in such a manner, that a process for encoding video pictures can be executed in a manner so that a pre-analysis of pictures is carried out, wherein for at least a part of macroblocks at least one control-parameter which assists the encoding process is determined based on at least one estimated parameter, in a second step the picture is encoded with encoding-parameters calculated based on the control-parameters determined in the pre-analysis step wherein the macroblock encoding process comprises the following steps given a target quantization parameter $QP_i^*$:

calculating Lagrangian multipliers used for motion estimation and mode decision of a macroblock i according to:

$$(\lambda_{motion,i})^2 = \lambda_{mode,i} = 0.85 \cdot QP_i^{*2} \text{ for H.263,MPEG-4, or}$$

$$(\lambda_{motion,i})^2 = \lambda_{mode,i} = 0.85 \cdot 2^{((QP_i^*-12)/3)} \text{ for H.264/AVC,}$$

for all motion-compensated macroblock/block modes determining associated motion vectors $m_i$ and a reference index $r_i$ by minimizing a Lagrangian functional $$[m_i, r_i] = \operatorname*{argmin}_{m \in M, r \in R} \{D_{DFD}(i, m, r) + \lambda_{motion,i} \cdot R_{MV}(i, m, r)\},$$

with a distortion term being given as $$D_{DFD}(i, m, r) = \sum_{(x,y) \in B_i} |s(x, y, t) - s'(x - m_x, y - m_y, t_r)|,$$

where s( . . . , t) and s'( . . . , $t_r$) an array of luminance samples of an original picture and a decoded reference picture given by a reference index r, respectively,
R denotes a set of reference pictures stored in the decoded picture buffer, M specifies a motion vectors search range inside a reference picture, $t_r$ is a sampling time of a reference picture referred by the reference index r, B is the area of a corresponding block or macroblock, and $R_{MV}(i,m,r)$ specifies a number of bits needed to transmit all components of a motion vector $m=[m_x,m_y]^T$ as well as the reference index r;

determining macroblock/block encoding modes $p_i$ of a macroblock i by minimizing a Lagrangian cost function $$p_i = \operatorname*{argmin}_{p \in S_{mode}} \{D_{REC}(i, p \mid QP_i^*) + \lambda_{mode} \cdot R_{all}(i, p \mid QP_i^*)\}$$

where $D_{REC}(i,p|QP_i^*)$ is defined as $$D_{REC}(i, p \mid QP_i^*) = \sum_{(x,y) \in B} (s(x, y) - s'(x, y \mid p, QP_i^*))^2$$

s( . . . ) and s'( . . . ) represent an array of original macroblock samples and their reconstruction, respectively, B specifies a set of corresponding macroblock/block samples, $R_{all}(i,p|QP_i^*)$ is a number of bits associated with choosing a mode p and quantization parameter $QP_i^*$, including bits for the macroblock/block modes, motion vectors and reference indices as well as quantized transform coefficients of all luminance and chrominance blocks, and $S_{mode}$ is a given set of possible macroblock/block modes.

10. Computer program embodied on a non-transitory computer readable storage medium within a computer that enables the computer to run a process for encoding video pictures, where a pre-analysis of pictures is carried out, wherein for at least a part of macroblocks at least one control-parameter which assists the encoding process is determined based on at least one estimated parameter, in a second step the picture is encoded with encoding-parameters calculated based on the control-parameters determined in the pre-analysis step wherein the macroblock encoding process comprises the following steps given a target quantization parameter $QP_i^*$:

calculating Lagrangian multipliers used for motion estimation and mode decision of a macroblock i according to:

$(\lambda_{motion,i})^2 = \lambda_{mode,i} = 0.85 \cdot QP_i^{*2}$ for H.263, MPEG-4, or $(\lambda_{motion,i})^2 = \lambda_{mode,i} = 0.85 \cdot 2^{((QP^*_i - 12)/3)}$ for H.264/AVC, for all motion-compensated macroblock/block modes determining associated motion vectors $m_i$ and a reference index $r_i$ by minimizing a Lagrangian functional $$[m_i, r_i] = \operatorname*{argmin}_{m \in M, r \in R} \{D_{DFD}(i, m, r) + \lambda_{motion,i} \cdot R_{MV}(i, m, r)\},$$

with a distortion term being given as $$D_{DFD}(i, m, r) = \sum_{(x,y) \in B_i} |s(x, y, t) - s'(x - m_x, y - m_y, t_r)|,$$

where s( . . . , t) and s'( . . . , $t_r$) represent an array of luminance samples of an original picture and a decoded reference picture given by a reference index r, respectively, R denotes a set of reference pictures stored in the decoded picture buffer, M specifies a motion vectors search range inside a reference picture, $t_r$ is a sampling time of a reference picture referred by the reference index r, B is the area of a corresponding block or macroblock, and $R_{MV}(i,m,r)$ specifies a number of bits needed to transmit all components of a motion vector $m=[m_x,m_y]^T$ as well as the reference index r;

determining macroblock/block encoding modes $p_i$ of a macroblock i by minimizing a Lagrangian cost function $$p_i = \operatorname*{argmin}_{p \in S_{mode}} \{D_{REC}(i, p \mid QP_i^*) + \lambda_{mode} \cdot R_{all}(i, p \mid QP_i^*)\}$$

where $D_{REC}(i,p|QP_i^*)$ is defined as $$D_{REC}(i, p \mid QP_i^*) = \sum_{(x,y) \in B} (s(x, y) - s'(x, y \mid p, QP_i^*))^2$$

s( . . . ) and s'( . . . ) represent an array of original macroblock samples and their reconstruction, respectively, B specifies a set of corresponding macroblock/block samples, $R_{all}(i,p|QP_i^*)$ is a number of bits associated with choosing a mode p and quantization parameter $QP_i^*$, including bits for the macroblock/block modes, motion vectors and reference indices as well as quantized transform coefficients of all luminance and chrominance blocks, and $S_{mode}$ is a given set of possible macroblock/block modes.

11. A non-transitory computer-readable storage medium, on which an executable program is stored, that enables a computer to execute a process for encoding video pictures according to claim 1.

12. Process in that a computer program as described in claim 10 is downloaded from a network for data transfer to a data processing unit, that is connected to said network.

* * * * *